J. F. STOCKE.
MACHINE FOR MEASURING TEXTILE FABRICS.
APPLICATION FILED MAR. 12, 1920.

1,437,207.

Patented Nov. 28, 1922.
7 SHEETS—SHEET 2.

Fig.2.

Witness

Inventor
John F. Stocke
By
Attorney

J. F. STOCKE.
MACHINE FOR MEASURING TEXTILE FABRICS.
APPLICATION FILED MAR. 12, 1920.
1,437,207. Patented Nov. 28, 1922.
7 SHEETS—SHEET 6.

Patented Nov. 28, 1922.

1,437,207

UNITED STATES PATENT OFFICE.

JOHN F. STOCKE, OF ST. LOUIS, MISSOURI, ASSIGNOR, BY MESNE ASSIGNMENTS, TO THE MEASUREGRAPH COMPANY, OF ST. LOUIS, MISSOURI, A CORPORATION OF DELAWARE.

MACHINE FOR MEASURING TEXTILE FABRICS.

Application filed March 12, 1920. Serial No. 365,268.

*To all whom it may concern:*

Be it known that I, JOHN F. STOCKE, a citizen of the United States, residing at St. Louis, State of Missouri, have invented new and useful Improvements in Machines for Measuring Textile Fabrics, of which the following is a specification.

This invention relates to improvements in machines for measuring textile fabric of that general type, as disclosed in the Letters Patent No. 1,252,258, granted January 1, 1917, and No. 1,280,012, granted September 24, 1918, wherein the material to be measured is moved between upper and lower rollers which may be spaced to facilitate the introduction or removal of the material and one of said rollers is utilized to effect the operation of the mechanism of the machine.

One object of the invention is to necessitate the zero-setting or "clearing" of the indicating mechanism or mechanisms as a prerequisite to the operation of the machine, thereby rendering it impossible for an independent measuring operation to form, as regards the values established, a continuation of the previous operation, as would be the case if a careless or unskilled operator were to introduce the material between and draw it through the rollers without zero-setting the mechanism, thus causing the values indicated by the operation to begin from the values indicated upon the completion of the previous operation.

A further object of the invention is to arrest the operation of the machine immediately that the measured material has been withdrawn from between the rollers, thus rendering it impossible for the machine to falsely indicate an increment of measurement as might otherwise be the case if the material, for example a remnant, were drawn through the rollers very rapidly or with violence.

A further object of the invention is to simplify and reduce the manual operations involved by providing for a single manual operation wherewith to effect the spacing of the rollers and the zero-setting of the indicating mechanisms.

A further object of the invention is to provide an improved construction of length indicating mechanism with special regard to its structural simplicity and certainty and accuracy of operation.

With the above objects in view the invention consists of certain novel features of structure, relation and combination which will be set forth at length as the description proceeds.

An embodiment of the invention is illustrated in the accompanying drawings, wherein:—

Similar characters of reference designate corresponding parts throughout the several views.

Figure 2:
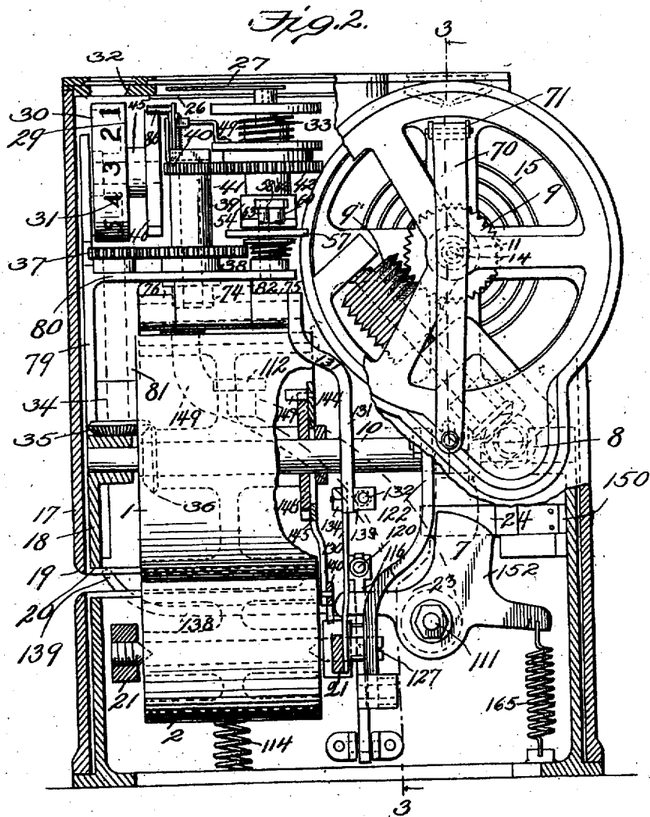
Figure 2 is a view showing the casing of the machine in vertical section longitudinally of the base and showing the enclosed instrumentalities partly in section and partly in elevation, as viewed from the left hand end of Figure 1.
Figure 3:
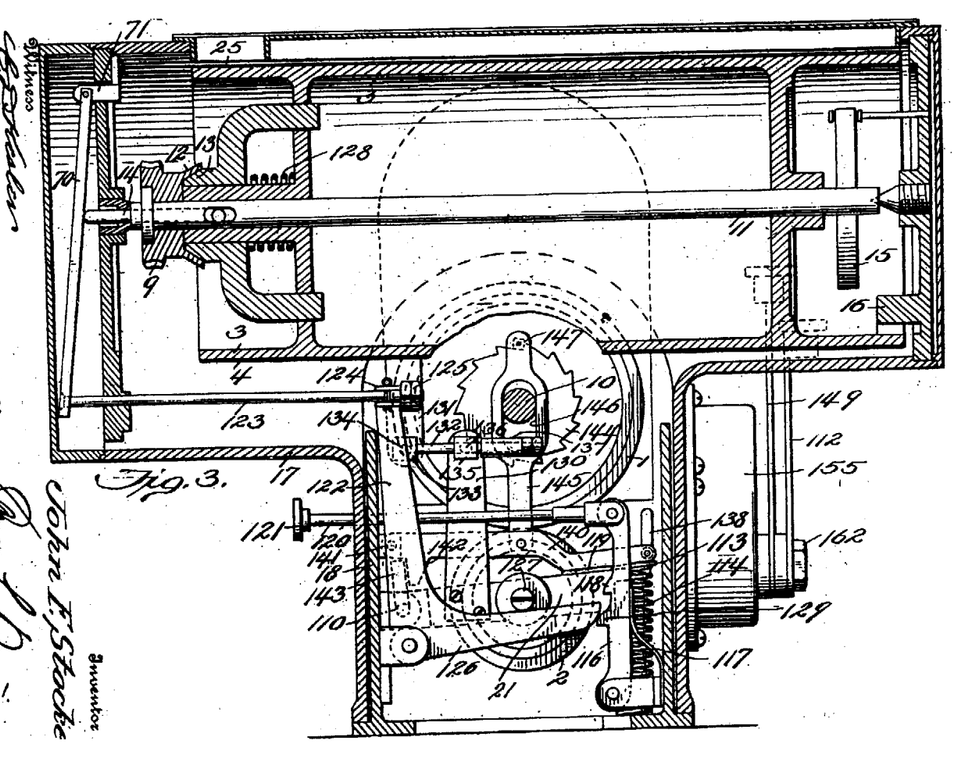
Figure 3 is a cross-sectional view on the line 3—3 of Figure 2, looking in the direction of the arrows.
Figures 6, 7:
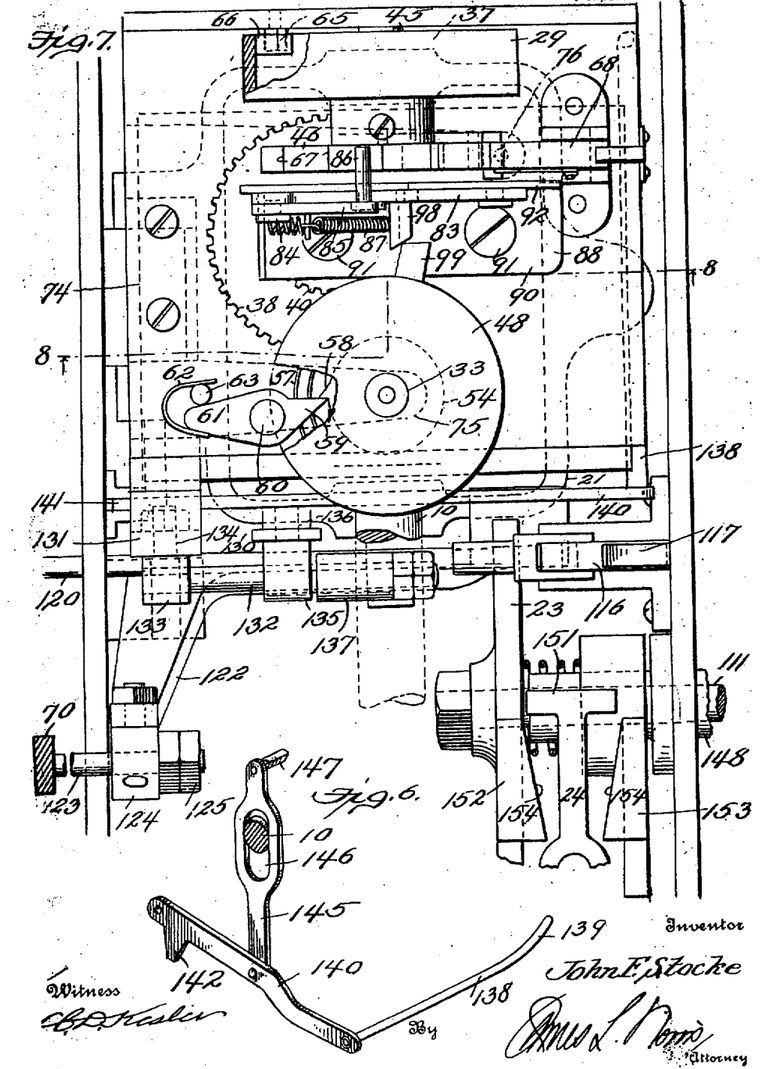
Figure 6 is a detail perspective view of the device which controls the introduction of the fabric between the rollers and the associated device for locking the power roller against rotation when the fabric has been withdrawn from the machine.
Figure 7 is a detail plan view on a somewhat enlarged scale showing the length indicating mechanism.

The features of the invention are shown in their application to a machine of the general structure disclosed in the said Letters Patent No. 1,280,012, and in the succeeding description the numerals 1 to 82, both inclusive, have, for convenience of reference, been used to designate the same parts which they designate in said patent. Said machine includes upper and lower rollers 1 and 2 (Figure 3), the upper roller being a power roller, a drum 3 which carries the price-computing chart 4 (Figure 1), the latter co-acting with a stationary price scale 5 mounted adjacent the slot 6 through which the readings of the chart are exposed, gearing 7—8—9 (Figure 2) between the shaft 10 of the roller 1 and the shaft 11 of the drum 3 for operating the latter, a clutch 12—13 (Figure 3) for controlling the operation of the drum 3, a stem 14 which is operated to disengage the clutch elements 12—13, a spring 15 for returning the drum to initial position when the clutch elements are held disengaged, thereby zero-setting the price computing chart, and a stop lug 16 for limiting the return movement of the drum by the spring 15. The operating parts are arranged in a casing 17 and the rollers 1 and 2 are supported by a frame 18, said casing and frame having registering slots 19—20 (Figure 2) through which the edge portion of the fabric is inserted or removed from between the rollers 1 and 2. To provide for such insertion or removal of the fabric the lower roller 2 is mounted in a depressible carrier 21 (Figures 3 and 4). When the measurement has been completed the fabric is slit, to furnish an indication of the line along which the measured length is to be cut or torn, by a blade 22 (Figures 10—11); and the carrier 21 is lowered to space the roller 2 from the roller 1, thereby to permit the removal of the goods, by the operation of an arm 23, which is actuated by pressing finger lever 112. The blade 22 and arm 23, as shown and preferred, are of the construction disclosed in the Letters Patent No. 1,259,389, granted March 12, 1918, an element 24, Figures 7 and 11 being employed to prevent a simultaneous operation of said blade and arm, as is hereinafter described and explained.

In the machine shown in the said Patent No. 1,252,258, the price computing chart has combined therewith a length indicating scale which, as disclosed herein and as also disclosed in the said Patent No. 1,280,012, is preferably retained in connection with length indicating mechanism. The length indicating scale is shown at 25 in Figure 1 and as retained in connection with the length indicating mechanism is chiefly of advantage in furnishing an ever present check on the accuracy of said mechanism.

The said length indicating mechanism includes a dial 26 (Figures 1 and 2) having a capacity of a yard and graduated into inches and eighths, quarters, thirds and halves of a yard and a pointer 27 operating over said dial, the inches being prominently displayed and separately identified by numerals 28 corresponding to the progression of measurement. The indicating mechanism also includes a yard indicator whose reading is displayed in adjacency to the dial and which conveniently consists of a wheel 29 (Figure 2) having a marginal flange 30 which bears numerals 31 indicative of yards. The dial is arranged centrally of the machine, immediately in front of and close to the chart 4 and vertically over the roller 1 and the wheel 29 is arranged immediately in front of and close to the dial 26, the numerals 31 being exposed through an opening 32. As thus arranged the numerals 28 and 31 will be squarely under the eyes of the operator and all of the readings of the machine, including those of the chart 4 and scale 5, will be displayed within a limited area well within the field of vision as the operator bends over the machine.

The pointer 27 is mounted on a vertical shaft 33 (Figures 2, 7 and 9) whose upper end projects centrally through the dial 26. The shaft 33 is driven from the shaft 10 of the roller 1 by gearing which includes a vertical shaft 34 having at its lower end a bevel pinion 35 (Figure 2) in mesh with a similar pinion 36 on the front end of the shaft 10 and having at its upper end a spur pinion 37 which drives a pinion 38 fast on a sleeve 39; the sleeve 39 has a bearing on an upright post 41 and at its upper end carries a pinion 40 meshing with a pinion 42 loose on the pointer shaft 33; the pinion 42 has a clutch element 43, Figure 9 formed therewith for co-operation with a companion clutch element 44 which through pin 52 rotates the shaft 33 and is slidable lengthwise thereof.

Figure 9:
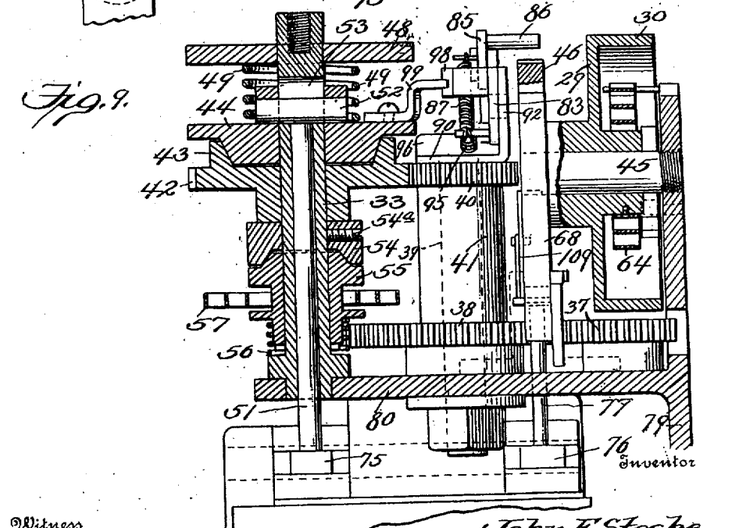
Figure 9 is a detail vertical sectional view of the length indicating mechanism in the central longitudinal plane of the machine.

The yard indicator wheel 29 is mounted on a horizontal post 45, Figure 9 and is driven from the shaft 33. The mechanism for operating the wheel 29 will be hereafter described and, being constructed in accordance with the present invention, differs in certain respects from the mechanism disclosed in the said Patent No. 1,280,012.

As disclosed in the said Patent No. 1,280,012, the clutch element 44 is normally held in engagement with the clutch element 43 by a spring 49 surrounding the shaft 33 which carries a plate 48 against which the upper end of the spring 49 bears. The shaft 33 has a central bore extending from its lower end in which is arranged a slidable stem 51 bearing at its upper end against a cross pin 52. The pin 52 has its ends secured in the hub of the clutch element 44 and operates in a slot 53 (Figure 9) in the shaft 33, thus connecting the element 44 and shaft 33 whereby said shaft will rotate with said element. When the stem 51 is raised or moved inward it will raise the clutch element 44, effecting its disengagement from the element 43.

For the purpose of zero-setting the pointer the shaft 33 (Figure 9) carries, below the pinion 42, a friction clutch element 54 held fast to said shaft in any suitable manner, for example, by a retaining screw 54ª and in constant engagement with a companion clutch element 55 loose on said shaft. The engagement of the clutch elements 54—55 is maintained by a spring 56 and the clutch element 55 is acted upon by a coil resetting spring 57. When the shaft 33 is driven by the pinion 42 and clutch 43—44 the clutch element 55 rotates with its companion element 54 only so long as the tension of the spring 57 permits and during such rotation stores power in said spring whereby the latter is effective, in all cases, to zero-set the pointer 27. During any further rotation of the clutch element 54, the element 55 will, consequent to the tensioning of the spring 57, remain substantially stationary, slipping relatively to its companion element 54. The element 54 (Figure 7) is provided with a single outwardly projecting tooth 58 which has a beveled side, and cooperates with a pawl 59. The pawl 59 is pivotally mounted upon a fixed upright post 60 and has a tail piece 61 normally held by a spring 62 against an abutment lug 63. In the normal operation of the machine the element 54 has clockwise rotation and at a period of each revolution its tooth 58 will displace and move past the pawl 59, the spring 62 restoring said pawl to its normal position as determined by the engagement of the tail piece 61 with the lug 63. When the clutch elements 43—44 are disengaged the shaft 33 is operated by the spring 57 and clutch 54—55 to zero-set the pointer 27. In such operation the clutch element 54 turns counter-clockwise and its tooth 58 coacts with the pawl 59 as a rigid stop to arrest the rotation of the shaft 33 when the pointer 27 reaches its zero position. It will be obvious that regardless of the number of revolutions which the pointer 27 may have made in the normal operation of the machine, its zero-setting movement will be within the limits of substantially a single revolution.

Figure 8:
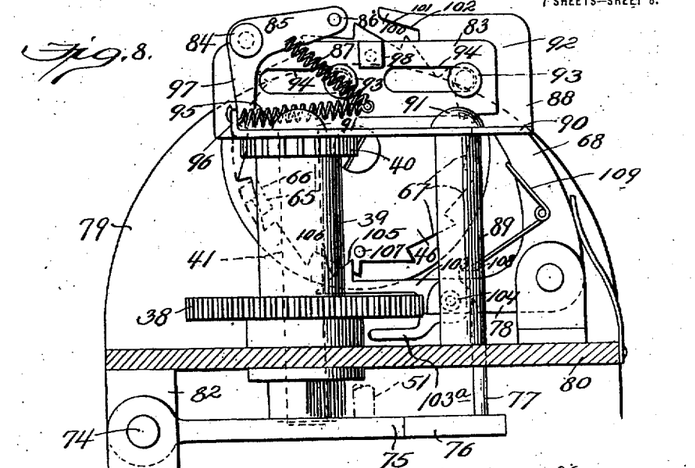
Figure 8 is a detail cross-sectional view on the line 8—8 of Figure 7, looking in the direction of the arrows.

The zero-setting movement of the yard wheel 29 is effected by a coil spring 64 (Figure 9) and is limited by a fixed stop lug 65 (Figures 7 and 8) co-acting with a lug 66 on said wheel, the spring 64 being tensioned as the wheel 29 is operated by the mechanism to be hereafter described. The hub of the wheel 29 carries a disc 46 which has uniformly-spaced marginal ratchet teeth 67 coinciding in number with the number of yards for which the machine has capacity. The teeth 67 are engaged by a pawl 68 (Figure 8) and the spring 64, Figure 9 is effective to zero-set the wheel 29 when the pawl 68 is held beyond the path of the ratchet teeth 67. The yard wheel 29, as well as the pointer 27, is zero-set during the interval in which the clutch elements 43—44 are disengaged. The mechanism (Figures 8 and 9) which controls or provides for the zero-setting of said pointer and wheel includes a horizontal rock shaft 74, Figure 8 provided with a horizontal arm 75 upon which rests the stem 51 and another horizontal arm 76 having at its free end an upright stem 77 which engages an angular extension 78 of the pawl 68. When the stems 51 and 77 are raised, by the operation of the shaft 74, the shaft 33 and wheel 29 are released and the springs 57 and 64 restore the pointer 27 and wheel 29 to zero positions as is obvious.

The stem 14 which provides for the zero-setting of the drum 3 is operated by a lever 70 (Figures 3 and 4) pendant from a pivotal support 71, and engaging the end of said stem. According to the disclosure of the said Patent No. 1,280,012, the operations of the lever 70 and of the rock shaft 74 are controlled by a single actuating element whereby a single manual operation will suffice to effect the zero-setting of the drum 3, pointer 27 and wheel 29. In putting this operative characteristic into effect the present invention involves certain improvements in the zero-setting mechanism, as will be hereafter explained in detail, whereby the zero-setting of the drum 3, pointer 27 and wheel 29 is effected automatically in connection with the separation or spacing of the rollers 1 and 2, thus reducing the separation of said rollers and the zero-setting of the several indicating parts to a single manual operation.

The dial 26 is supported by the top wall of the casing 17. The other elements of the length indicating mechanism are supported by a bracket 79 (Figures 2, 7, 8 and 9) which rests upon the frame 18 and has a shelf 80 projecting over the roller 1. The bracket 79 carries a supporting bearing 81 (Figure 2) for the shaft 34 and also carries the post 45. Figure 9 which supports the wheel 29. The shelf 80 provides a bearing for the shaft 33 and carries the post 41 upon which is mounted the sleeve 39 and a supporting sleeve 82 (Figures 2, 8 and 9) for the rock shaft 74.

So far, I have described nothing new.

As in the said Patent No. 1,280,012 the wheel 29 is driven by the shaft 33 through operative connections which move said wheel a step upon the completion of each revolution of said shaft. One feature of the present invention consists in certain improvements in the operative connections between said shaft and said wheel.

According to the present invention, the disc 46 is actuated (Figures 7, 8 and 9) by a transversely movable slide 83 upon which is pivoted, as at 84, a feed pawl 85 having a lateral projection 86 for engagement with the teeth 67 of the disc 46, said pawl preferably being held by a spring 87 to insure the engagement of its projection with said teeth. The slide 83 is vertically disposed and is mounted upon an angle piece 88 supported by the post 41 and by a second post 89, both upright from the shelf 80, the horizontal flange 90 of said angle piece being fastened to said posts as by screws 91. The slide 83 is held against the vertical flange 92 of the angle piece 88 by suitable fastenings 93 secured in said flange and whose shanks project through horizontal slots 94 in said slide and thereby guide said slide in its movements. The slide 83 is held in and moved to a normal position by a spring 95 connected to said slide and to the angle piece 88. The flange 90 of the angle piece has at its end adjacent the pawl 85 an upward projection 96 and said pawl has an angular extension or tail piece 97 which is engaged by the projection 96 when the slide 83 assumes its normal position, such engagement being effective to move the pawl 85 clear of the teeth 67 whereby said pawl will present no obstruction to the reverse rotation of the disc 46 incident to the zero-setting of the wheel 29.

The slide 83 is provided with a lug 98 for engagement by a lug 99 (Figures 7 and 9) rotatable with the shaft 33 and at a period of each revolution of said clutch element the lug 99, engaging the lug 98, will move the slide in opposition to the spring 95 whereby the pawl 85 whose projection 86 engages the teeth 67, will advance the disc 46, and with it the wheel 29, through the distance of one of said teeth, thus exposing the next consecutive numeral of the group 31 through the opening 32 and effecting the indication of the measurement of a yard of material. The pawl 68 of course prevents retrograde movement of the disc 46 and wheel 29. The lug 99 is secured to the clutch element 44 and when said clutch element is raised in connection with the zero-setting of the pointer 27, as above explained, said lug is raised clear of the lug 98 which, therefore, in no case can present an obstruction to the zero-setting rotation of the shaft 33 upon which the clutch element 44 is mounted.

In order to positively prevent a movement of the disc 46 by the slide 83 through a distance greater than the length of one of the teeth 67, the vertical flange 92 (Figure 8) of the angle piece 88 is formed with an overhanging projection 100 disposed in the plane of said flange and delimiting a recess 101 whose upper wall 102 is inclined downward toward the base or closed end of said recess. When the slide 83 is advanced the projection 86 of the pawl 85, acting on the adjacent tooth 67, will enter the recess 101 and the upper wall 102 of said recess will positively hold the projection 86 against the tooth 67 upon which it may be acting and prevent an outward radial displacement of said projection relatively to the disc 46. In this way the projection 86 exercises a dual function, co-operating with the perpendicular face of the tooth 67 in advance to effect an operative movement of the disc 46 and cooperating with the inclined face of the next rearmost tooth 67 to prevent a relative advancing movement of said disc. It follows that the advancing movement of the disc 46 is completely under the control of the projection 86 and that it is impossible for said disc to advance at a speed greater than the speed of movement of said projection or to advance relatively to said projection during the advancing movement of the slide 83. By virtue of such control of the disc 46 it is impossible for the wheel 29 to furnish a false indication of measurement as would be the case if said wheel in a single movement and by momentum were to advance through two intervals of the group of numerals 31, for example, and with reference to the opening 32, jumping from "1" to "3" and skipping "2".

According to the present invention, provision is made for preventing rebounding of the wheel 29 and associated disc 46 in connection with the zero-setting of said wheel and as a consequence of the sudden impact of the lug 66 against the fixed stop lug 65, thereby to insure that the wheel 29 when zero-set shall, under all circumstances, remain at zero position, until an operation of the machine is in progress. The means employed is preferably of the construction disclosed (Figure 8) and consists of a dog 103 pivoted at 104 to the extension 78 of the pawl 68 and having at its free end a tooth 105 provided with a cam face 106, said tooth being for co-operation with a lug 107 projecting laterally from the disc 46. The dog 103 has above and in rear of its pivot 104 a lug 108 for engagement with the upper edge of the extension 78 and a spring 109 secured to the pawl 68 bears on the lug 108 to hold the latter against the extension 78 and thereby hold said dog in a normal position relative to said pawl. When the pawl 68 is in its normal operative position the tooth 105 lies beyond the path of the lug 107. When the wheel 29 is at zero the lug 107 will be located immediately in front of the tooth 105; and when the pawl 68 is operated to clear the disc 46, thereby to permit the zero-setting of the wheel 29 by the spring 64, the dog 103, moving with said pawl, will be raised to a position wherein its tooth 105 lies in the path of the lug 107 which, in the reverse rotation of the disc 46 incident to the return of the wheel 29, will act on the cam face 106, displacing the pawl and moving past the tooth 105. As soon as the lug 107 has thus passed the tooth 105 the spring 109 returns the dog 103 to its normal position relative to the pawl 68 and the tooth 105 will thereby be brought back into the path of the lug 107 but behind said lug whereby to co-act with the same as a stop in preventing any rebound of the disc 46 and wheel 29. The dog 103 is preferably provided with a tail piece 103ª which projects under the pinion 38 and by its engagement with said pinion positively limits the upward movement of said dog attendant upon the disengagement of the pawl 68 from the teeth 67, thus insuring that said dog may not be moved to a position wherein its forward point would lie athwart or above the lug 107.

Figure 1:
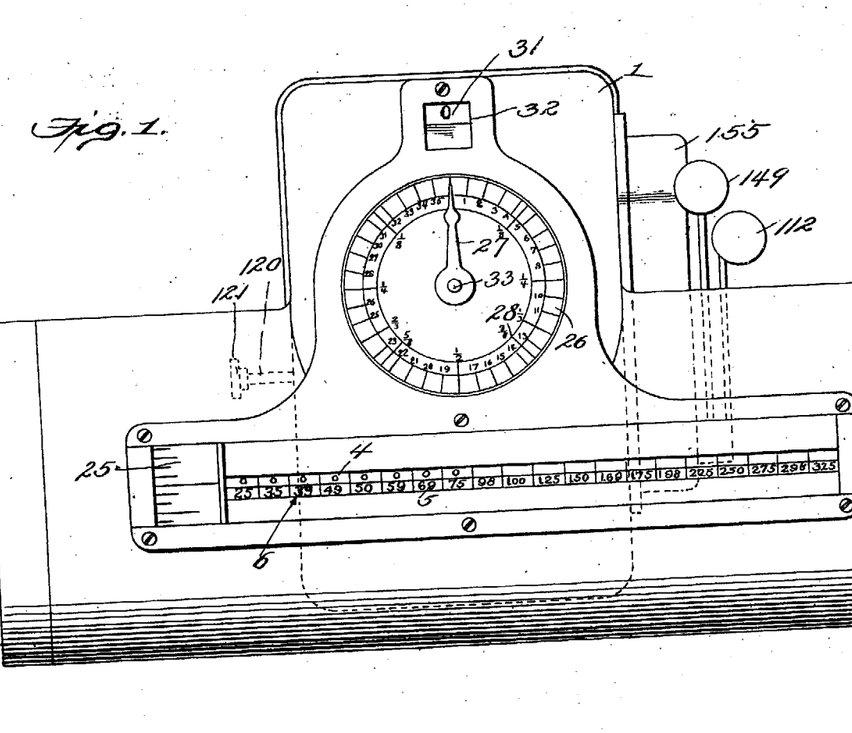
Figure 1 is a plan view of a machine in which the features of the invention are incorporated, said machine effecting both the measurement of the fabric and the computation of its price.

The carrier 21 for the lower roller 2 and its associated parts is preferably of the construction and arrangement disclosed in the Letters Patent No. 1,259,389, granted March 12, 1918. Thus, the carrier 21 is in the form of a rectangular frame (Figures 2 and 11) and is pivoted (Figure 3) to one side of the supporting frame 18, the pivotal connections preferably including a rock shaft 110 which is turned when the carrier 21 is raised or lowered about its pivotal axis. The arm 23 by which the carrier is depressed is mounted upon a transverse shaft 111 (Figures 2 and 11) which, externally of the casing 17, carries an operating lever 112. The carrier 21 is provided at its free side with a projection 113 and is normally held in its elevated position by a spring 165 arranged under and acting on said projection. For the purpose of holding the carrier in the lowered position to which it is moved when the arm 23 is operated, a detent 116 (Figures 3 and 4) is provided. Said detent is movable transversely of the casing 17, being arranged vertically and pivoted at its lower end to the frame 18, and is operated by a spring 117. At a suitable point the detent 116 is provided with a tooth 118 for engagement over a projection 119 at or adjacent the forward side of the carrier. In order to disengage the detent from the carrier, thereby to permit the upward movement of the carrier by the spring 114, a transversely movable stem 120 is provided. Said stem is pivoted at its inner end to the upper end of the detent 116 and, projecting loosely through openings in the casing 17 and frame 18, is provided externally of the casing with an operating head or finger piece 121 (Figures 1 and 2). By pushing the stem 120 inward the detent 116 will be pushed back against the action of its spring 117 and its tooth 118 will be moved clear of the projection 119 whereupon the spring 114 will raise the carrier to its normal elevated position.

According to the invention, the operations of the zero-setting devices are automatically effected in connection with the spacing or separation of the rollers 1 and 2 whereby a single manual operation will serve both for the spacing of said rollers and for the operation of the several zero-setting devices. As shown and preferred, the movement of the lever 70 to operate the stem 14 and provide for the zero-setting of the drum 3 is effected by a vertical arm 122 (Figures 3 and 4) pivoted at one side of the casing to the frame 18, slightly below the pivot of the carrier. A link 123 connects the lower end of the lever 70 and the upper end of the arm 122, said link being suitably connected to the lever 70 whereby it has a slight measure of vertical pivotal play relatively to said lever. The connection between the link 123 and the upper end of the arm 122 includes a sleeve 124 which is pivoted on a horizontal axis to said arm and, surrounding said link, bears against nuts or a head 125 upon its inner end. The arm 122 is operated by or in connection with the lowering of the carrier and for such purpose is provided with an angular lever arm 126 which extends under and is engaged by a lateral projection 127 provided on the carrier 21, said projection preferably being formed as an extension of one of the cone bearings for the roller 2. It will be obvious that when the carrier is lowered to space the rollers its projection 127, acting on the lever arm 126, will produce an inward transverse movement of the arm 122 which, through the link 123, and lever 70, will operate the stem 14 to disengage the clutch elements 12—13 and render the spring 15 effective to zero-set the drum 3. The movable clutch element 13 is normally held in engagement with the clutch element 12 by a spring 128 (Figure 3) and in order that the full effect of said spring may be realized at the time it initiates the engagement of said clutch members it is preferred to so release the lever arm 126 that its return movement (and the return movements of its associated parts) as effected by the spring 128 will be independent of the return movement of the carrier. For this purpose the arm 126 is continued forward beyond the projection 127 and the detent 116 is provided below the tooth 118 with a suitably longer tooth 129 which, when the lever arm 126 is lowered in the manner described, will engage over the free end of said arm and act independently of the carrier in holding the arm 126 in its lowered position. The tooth 129, being longer than the tooth 118 and closer to the pivot of the detent 116, will not disengage the arm 126 until after the release of the carrier 21 and in the momentary interval the carrier will reach its normal position whereby when the tooth 129 releases the arm 126 the projection 127 of the carrier will neither control nor obstruct the return movement of said lever arm. In this way the spring 128 is permitted to act with full effect in initiating the engagement of the clutch members 12—13 subsequent to the zero-setting of the drum 3.

For the operation of the rock shaft 74, the carrier 21 has at one side thereof (Figures 2, 3 and 4) a fixed upright arm 130, the rock shaft 74 has fixed thereto a depending arm 131, and a suitable linkage is provided between said arms whereby the arm 130, moving with the carrier as the latter is depressed, will rock the shaft 74 in a direction to raise the arms 75 and 76 and through the respective stems 51 and 77 and associated connections provide for the operation of the springs 57 and 64 by which the pointer 27 and wheel 29 are, respectively, returned to zero. The connections between the arms 130 and 131 consist of a link 132 fastened in a head 133 which is pivoted on a horizontal axis 134 to the lower end of the arm 131, a block 135 which is pivoted on a horizontal axis 136 to the upper end of the arm 130 and is slidably mounted on the link 132 and a collar 137 secured on the link 132 beyond the block 135. When the carrier 21 is lowered the arm 130 pulls the link 132 downward about its pivot 134 and the block 135 at the same time turns on its pivot 136 and slides toward the free end of said link, in the course of its sliding movement engaging the collar 137. When the block 135 thus engages the collar 137 the movement of the arm 130 is transmitted by the link 132 to the arm 131 and the shaft 74 is thereby rocked to raise the arms 75 and 76 and provide for the zero-setting of the pointer 27 and wheel 29 in the manner explained. The return of the carrier to its normal elevation in connection with the operation of the spring 49 to engage the clutch member 43 with the member 44 restores the shaft 74 and the parts associated therewith to their normal positions.

The invention includes means for normally obstructing the slots 19—20 whereby material may not be introduced through said slots and between the rollers until the indicating parts have been zero-set, and whereby on the normal operation of the element which provides for the zero-setting operations the obstruction will be moved clear of the slots 19 and 20. In the embodiment disclosed the obstruction (Figures 2, 3 and 6) consists of a horizontal bar 138 arranged within the carrier parallel to one side thereof, said bar having an angular portion 139 which normally projects across the slots 19—20 in the path of movement of the material and thereby prevents the introduction or movement of the material between the rollers.

The operation of the bar 138 is controlled by the element which controls the operations of the zero-setting devices, such element in the embodiment disclosed being the carrier 21. The operative relation of the bar 138 to the carrier 21 is established by an arm 140 which is pivoted, as at 141, to the frame 18, the pivot 141 being located suitably above the pivotal connections of the carrier 21 and the bar 138 is carried by and projects laterally from the free end of the arm 140. Said arm is provided, suitably in advance of its pivot, with a depending lug 142, and the rock shaft 110, co-axial with the pivot of the carrier 21 and which, as explained, is turned by the movements of said carrier, is provided with an upwardly projecting arm 148 for cooperation with the lug 142. When the carrier 21 is lowered the arm 148 is moved inward and, engaging the lug 142, raises the arm 140 whereby the bar 138 (Figure 4) is lifted above and clear of the slots 19—20 at which time said slots are unobstructed and the material to be measured may be freely introduced between the rollers 1 and 2. When, by the manipulation of the detent 116 as explained, the carrier is returned to its elevated position to press the roller 2 against the fabric interposed between it and the roller 1, the arm 140 will drop by gravity until the bar 138 strikes the fabric, said bar (Figure 5) being supported by the fabric while the latter is being drawn between the rollers to effect the measuring operation. When the measuring operation has been completed and the fabric has been withdrawn from between the rollers the bar 138 will drop to its normal position (Figures 2 and 3) wherein its angular portion 139 projects across the slots 19—20 as above explained, the final downward movement of said bar being limited by the engagement of the arm 140 upon the lug 119.

The invention includes means to arrest the operation of the machine immediately that the measured material has been withdrawn from between the rollers 1 and 2, thereby to render it impossible for the machine to falsely indicate an increment of measurement; and in the construction shown and preferred such means is correlated to the bar 138 and arm 140, and includes a ratchet wheel 144 (Figures 3 and 4) mounted on the shaft 40 of the roller 1 and a dog 145 controlled by the arm 140. The dog 145 is in the form of a vertical bar which is pivoted at its lower end to the arm 140, is formed with a guide slot 146 through which the shaft 10 extends, and at its upper end is provided with a projection 147 for engagement with the teeth of the ratchet wheel 144. When the arm 140 is held partly elevated by the support of the bar 138 on the fabric (Figure 5) during the operation of the machine it is effective to hold the dog 145 in a position in which its projection 147 is located beyond the ratchet wheel 144 and thereby presents no obstruction to the rotation of the roller 1; but when the measured fabric is withdrawn from between the rollers 1 and 2 (Figures 2 and 3) and the support for the bar 138 is thus withdrawn the arm 140 moves to its lowermost position and in such movement pulls the dog 145 downward whereby its projection 147 will engage the adjacent tooth of the ratchet wheel 144 and prevent further rotation of the roller 1. It will thus be seen that immediately that the fabric is withdrawn from between the rollers 1 and 2 the rotation of the roller 1 is positively arrested and any further rotation of said roller by momentum, due to the rapidity with which the operator may have pulled the fabric between the rollers, is completely and positively prevented.

The knife 22 (Figures 10 and 11) is mounted on a tubular rock shaft 148 which surrounds the shaft 111 of the arm 23 and externally of the casing carries a spring controlled operating lever 149. The element 24 and its associated parts are of the construction disclosed in the said Patent No. 1,259,389 granted March 12, 1918. That is to say, said element is pivoted at its rear end for horizontal swinging movement and is normally held centered by springs 150 engaging its pivoted heel portion; at its front end it has a transverse head 151 for co-operation with upright arms 152 and 153 mounted on or movable with the shafts 111 and 148, respectively, said arms being disposed at opposite sides of the element 24 and having confronting cam faces 154 for engagement with the head 151. The operating levers 112 and 149 are arranged in adjacency and the element 24 prevents their simultaneous operation but enables either of them to be independently operated. Thus if the lever 112 be depressed to operate the arm 23 and lower the carrier 21 the arm 152, acting on the head 151 will swing the element 24 to project said head across the path of the arm 153, the head thus functioning as a lock for the arm 153 and the parts associated therewith so long as the arm 23 is held lowered; in like manner if the lever 149 be depressed to operate the knife 22 the arm 123, acting on the head 151, will swing the element 24 to project said head across the path of the arm 152, the head thus functioning as a lock for the arm 152 and the parts associated therewith so long as the knife 22 is held lowered. If both levers 112 and 149 be pressed simultaneously no operation will result because the head 151, co-acting with their cam faces, will simultaneously lock both of the arms 152 and 153 and the parts associated therewith.

Figure 10:
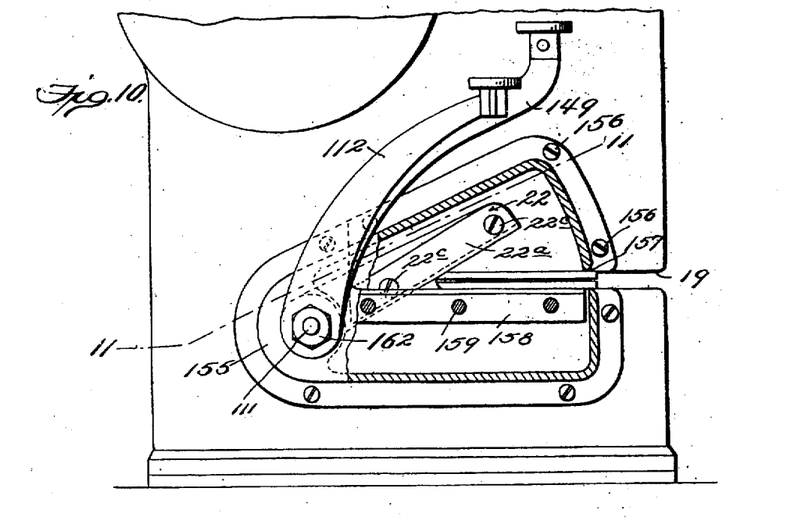
Figure 10 is a side elevation, partly in section, of the lower forward portion of the machine as viewed from the right hand of Figures 1 and 3, showing details of the knife structure for slitting the material to indicate the line along which the measured length is to be cut or torn.
Figure 11:
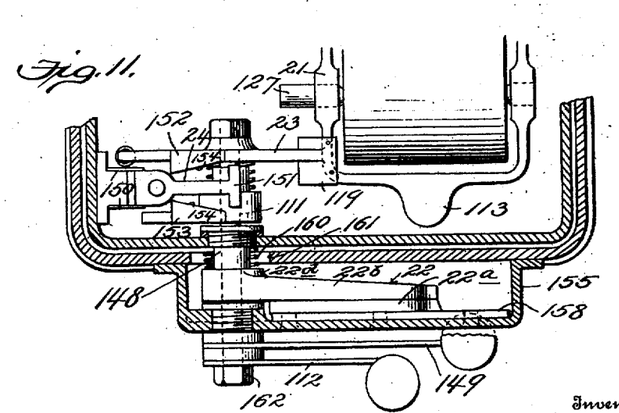
Figure 11 is a detail horizontal sectional view on the line 11—11 of Figure 10.

As disclosed in Figures 10 and 11 the knife 22 and the fixed blade with which it co-operates are mounted externally of the casing 17 but within a housing 155 removably secured to said casing as by fastening screws 156, said housing having a slot 157 registering with the slot 19 and below said slot carrying the fixed blade 158, preferably secured by screws 159 and with which the knife 22 cooperates. The knife 22 is preferably composed of a blade 22ᵃ and an arm 22ᵇ to which said blade is secured by screws 22ᶜ and the arm 22ᵇ has a hub 22ᵈ which is preferably keyed to the shaft 148 so as to turn with said shaft but be removable therefrom; and the blade 22ᵃ is pressed towards the fixed blade 158 by a spring 160 surrounding the shaft 148 and arranged between the hub 22ᵈ and the frame 18 and preferably having a seating in a recess or opening 161 formed in the casing 17 concentric to the shaft 148. The levers 112 and 149 are, of course, mounted externally of the housing 155 and are held against endwise displacement from the respective shafts 111 and 148 by a nut 162 secured to the end of the shaft 111. The housing 155 normally protects the blades 22ᵃ and 158 against damage by contact with other objects and also serves as a safety guard for the protection of the operator or other person happening to be near the machine. On the removal of the nut 162 and the removal of the housing 155 from the casing 17 the blades 22ᵃ and 158 are readily accessible for the purpose of sharpening or renewal.

Figures 4, 5:
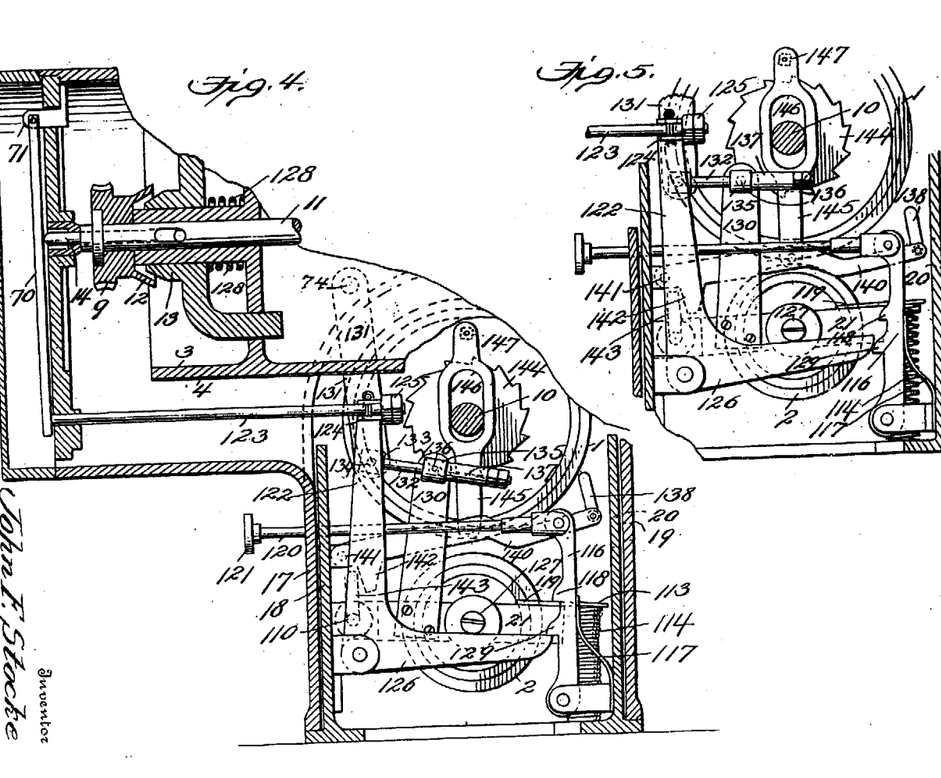
Figure 4 is a detail fragmentary sectional view in the same plane as Figure 3 but showing certain parts as operated in connection with the spacing or separation of the rollers.
Figure 5 is a detail fragmentary sectional view in the same plane as Figure 3 but showing the rollers positioned as they would be with fabric between them and the rod 138 elevated as it would be supported by the fabric.

The operation of the machine will be readily apparent from the foregoing description, but, as a matter of convenience, it is briefly summarized as follows:—Assuming the parts to be in the relation shown in Figures 2 and 3 the lever 112 is first operated (Figure 4) to lower the carrier 21 and space the roller 2 from the roller 1, to provide for the zero-setting of the indicating devices and to raise the bar 138 above the slots 19—20. The carrier 21 is automatically held in its lowered position by its projection 119 catching under projection 118 on the detent 116 and while the rollers 1 and 2 are thus maintained in spaced relation the fabric to be measured or the side edge portion of such fabric is introduced between them with the forward edge of the fabric adjacent the knife 22. Thereupon the stem 120 is pushed inward to disengage the detent 116 from the carrier 21 and the arm 126 upon which the carrier 21 is raised (Figure 5) by the spring 114 to its normal elevated position, the parts of the zero-setting mechanisms are restored to their normal positions by springs 5, 57 and 64 being released in the manner explained and the bar 138 comes to rest upon the fabric which, when tensioned, through raising said bar and the arm 140 holds the dog 145 with its projection 147 clear of the ratchet wheel 144. The measuring operation is then initiated by pulling the fabric through the machine, the fabric in its movement applying power to the roller 1 by which all the indicating and measuring devices are driven in the manner explained. The drum 3 rotates in ratio to the progression of measurement and by means of the chart 4 and scale 5 gives a continuous indication of the total price, based on a determined price per yard, of the goods passed while at the same time the pointer 27 gives a continuous indication of inch measurement and the wheel 29 gives a continuous indication of yard measurement, said wheel being operated a step upon the completion of each revolution of the pointer by the movement of the slide 8° Figures 7, 8 and 9 and pawl 85 as effected by the engagement of the lug 99 (rotating with the shaft 33 which carries the pointer 27) with the lug 98 on said slide. When the determined length of goods has been passed. as indicated by the pointer 27 and wheel 29, the operator of course releases the pull on the fabric and thus stops the measuring operation. The knife 22, Figures 10 and 4 is then operated by the lever 149 to slit the edge of the material and thereby provide an indication of the line along which the measured length is to be cut or torn. Having taken note of the price computation the lever 112 is operated (Figure 4) to space the roller 2 from the roller 1 and facilitate the removal of the material from between said rollers. such operation of the lever 112 also providing for the zero-setting of the indicating devices as previously explained. The machine is then ready for another operation. but the operator can, if desired, immediately restore the roller 2 to its normal elevated position and lock the roller 1 against rotation by actuating the stem 120, the projection 147 of the dog 145 engaging the ratchet 144 when the roller 2 is raised and no fabric (Figure 3) is in the machine. In any case, the roller 2 must be spaced from the roller 1 prior to each operation of the machine. both to provide for the introduction of the fabric and the rotation of the roller 1 and the zero setting of the indicating devices.

In case the material to be sold is a remnant, the machine will be used to determine its length, either at or prior to the time of the sale. When measuring a remnant the entire length of material is drawn through the machine and substantially as soon as the material has passed from between the rollers 1 and 2 the bar 138 and arm 140 will drop, whereupon the projection 147 of the dog 145 will engage the ratchet 144 and arrest any continued rotation of the roller 1 that might otherwise be incident to a sudden jerk upon the material to pull it from the machine.

It will be understood that no specific description herein contained is intended to put any limitation upon the scope of the appended claims which does not inhere in the language thereof.

Having thus described my invention, what is claimed is:—

1. In a machine for measuring textile fabric, the combination of indicating means including a continuously rotatable pointer-carrying shaft, other indicating means including an intermittently rotatable number-bearing wheel, a ratchet disc rotatable with said wheel, a spring-held reciprocatory slide having a pawl for engagement with said disc and also having a lug and a lug rotatable with said shaft for engagement with the lug on said slide to operate the slide at a period of each revolution of the shaft.

2. In a machine for measuring textile fabric, the combination of an intermittently rotatable indicator part, a ratchet disc rotatable with said part, a spring-held reciprocatory slide having a movable pawl for engagement with said disc, means for operating said slide at regular periods in the operation of the machine, and means for positively holding said pawl against said disc as the slide is operated.

3. In a machine for measuring textile fabric, the combination of an intermittently rotatable indicator part, a ratchet disc rotatable with said part, a spring-held reciprocatory slide having a movable pawl for engagement with said disc, means for operating said slide at regular periods in the operation of the machine and a bracket upon which said slide is mounted, said bracket having an overhanging part for engagement with the pawl during the operation of the slide to hold the pawl positively against said disc.

4. In a machine for measuring textile fabric, the combination of an intermittently rotatable indicator part, a ratchet disc rotatable with said part, a spring-held reciprocatory slide having a movable pawl for engagement with said disc, means for operating said slide at regular periods in the operation of the machine and means for moving the pawl clear of the disc when the slide is re-set by its holding spring.

5. In a machine for measuring textile fabric, the combination of an intermittently rotatable indicator part, a ratchet disc rotatable with said part, a spring-held reciprocatory slide having a pivoted pawl provided with a projection for engagement with said disc and also with an angular extension, means for operating said slide at regular periods in the operation of the machine, and a bracket upon which said slide is mounted, said bracket having at one end an overhanging part for engagement with said projection during the operation of the slide to hold the pawl positively against said disc and having at its other end a lug for engagement with said extension when the slide is re-set by its holding spring to move the pawl whereby its projection will be clear of said disc.

6. In a machine for measuring textile fabric, the combination of an intermittently rotatable indicator part, a ratchet disc rotatable with said part, a stationary bracket, a spring-held slide mounted on said bracket, a movable pawl on said slide for engagement with said disc, and means for operating said slide at regular periods in the operation of the machine, said bracket having means for holding said pawl positively against said disc during the operation of the slide and having other means for moving said pawl clear of said disc when the slide is re-set by its holding spring.

7. In a machine for measuring textile fabric, the combination of an intermittently rotatable indicator part, a spring for restoring said part to its zero position, a stop lug for limiting the return movement of said part by said spring, a ratchet disc rotatable with said part, a pawl for cooperation with said disc to hold said part against retrograde movement, means for disengaging said pawl from said disc to permit the operation of said spring, and means including companion elements on said pawl and disc and operative when the pawl is disengaged to hold said part from rebounding from its zero position.

8. In a machine for measuring textile fabric, the combination of an intermittently rotatable indicator part, a spring for restoring said part to its zero position, a stop lug for limiting the return movement of said part by said spring, a ratchet disc rotatable with said part, a pawl for co-operation with said disc to hold said part against retrograde movement, means for disengaging said pawl from said disc to permit the operation of said spring, a spring-held dog movably mounted on said pawl and provided with a cam-faced tooth and a lug on said disc for co-operation with said tooth when the pawl is disengaged, thereby to prevent said part from rebounding from its zero position.

9. In a machine for measuring textile fabric, the combination of upper and lower rollers, the upper roller being a power roller, a depressible carrier for the lower roller operable to hold the lower roller against or to space it from the upper roller, a shaft on which the upper roller is mounted, price computing means including as companion elements a chart and a price scale, said elements being relatively movable, gearing for driving the movable element from the shaft of the upper roller, length indicating means including a dial arranged in adjacency to said chart and a pointer operating over said dial, a shaft carrying said pointer, gearing for operating said pointer carrying shaft from the shaft of said power roller, means for zero-setting said price computing means, means for zero-setting said length indicating means and operative connections between both of said zero-setting means and said depressible carrier whereby said carrier serves as a common controlling element for both of said zero-setting means.

10. In a machine for measuring textile fabric, the combination of a power roller, a second roller arranged below the power roller, a shaft on which the power roller is mounted, length indicating mechanism including means for indicating fractions of a yard, adjacent means for indicating yards, both means having movable elements, gearing operated by said power roller for operating said movable elements, devices for holding said movable elements against retrograde movement, a depressible carrier for the lower roller operable to hold the lower roller against or to space it from the power roller, operative connections between said devices and said carrier whereby the latter when depressed operates said devices to simultaneously release said movable elements, and means for automatically zero-setting said movable elements upon the operation of said devices to release them.

11. In a machine for measuring textile fabric, the combination of a power roller, a second roller arranged below the power roller, a shaft on which the power roller is mounted, price computing means located adjacent the rear end of the power roller and above said shaft, length indicating means located in front of and in adjacency to said price computing means and above said power roller, gearing for operating the price computing means and driven from the rear end of said shaft, other gearing for operating the length indicating means and driven from the front end of said shaft, both gearings including devices for holding the movable elements of said respective means against retrograde movement and said devices being operable to permit of retrograde movement of said elements, a depressible carrier for the lower roller operable to hold the lower roller against or to space it from the power roller, operative connections between said devices and said carrier whereby the latter when depressed operates said devices to simultaneously release said movable elements and means for automatically zero-setting said movable elements upon the operation of said devices to release them.

12. In a machine for measuring textile fabric, the combination of price computing means, length indicating means in front of and in adjacency to said price computing means, a shaft located under said length indicating means and geared at its rear end to said price computing means and at its front end to said length indicating means, a power roller over which the fabric is drawn mounted on said shaft intermediate the gearings at the respective ends thereof, a lower roller, a depressible carrier for the lower roller operable to hold the same against or to space it from the power roller, devices for automatically zero-setting the movable elements of said price computing and length indicating means, and controlling means for said zero-setting devices operatively connected to said carrier as a common actuating element whereby said carrier when depressed provides for the operation of said zero-setting devices.

13. In a machine for measuring textile fabric, the combination of a power roller, a second roller located below the power roller, a depressible carrier for the lower roller operable to hold the same against or to space it from the power roller, a shaft on which the power roller is mounted, a dial having a capacity of a yard, a pointer operating over said dial, a shaft carrying said pointer, a wheel calibrated in yards, means for operating the wheel from the pointer-carrying shaft, pawl and ratchet means for holding the wheel against retrograde movement, gearing for operating the pointer-carrying shaft from the shaft of said power roller and including a clutch, and means operated by said carrier when depressed for simultaneously disconnecting the elements of said clutch and of said pawl and ratchet means.

14. In a machine for measuring textile fabric, the combination of a power roller, a second roller below the power roller, a pivoted carrier for the second roller operable to hold the same against or to space it from the power roller, length indicating means operated by the power roller and including a rotatable part and a device for holding said part against retrograde movement, a rock-shaft operatively connected to said device whereby to operate the same to release said rotatable part and having a depending arm, an upright arm on said carrier, a link pivoted to the lower end of said depending arm, a pivotal and slidable connection between said link and the upper end of said upright arm, said link having a head for engagement by said connection when the carrier is lowered whereby the carrier will effect an operation of said rock shaft.

15. In a machine for measuring textile fabric, the combination of a power roller, a second roller below the power roller, a pivoted carrier for the second roller operable to hold the same against or to space it from the power roller, a rotatable drum disposed transversely of the power roller adjacent one end thereof, gearing between the power roller and said drum including a clutch located co-axially of said drum, a depending lever for disengaging the elements of said clutch, a lever pivotally mounted adjacent said carrier and having an upright arm and an angularly extended arm, said carrier having means for engagement with said angularly extended arm whereby the latter is depressed with said carrier and a link connecting said depending lever and said upright arm.

16. In a machine for measuring textile fabric, the combination of a power roller, a second roller below the power roller, a spring-pressed pivoted carrier for the second roller operable to hold the same against or to space it from the power roller, indicating means including a rotatable part, gearing between said power roller and the rotatable part including a spring-held clutch, means for disengaging the elements of said clutch including an arm pivoted adjacent said carrier, said carrier having means for engagement with said arm whereby the latter is depressed with said carrier, and a movable detent for holding said carrier and arm depressed, said detent in its movement to its normal position momentarily holding said arm subsequent to its release of said carrier.

17. In a machine for measuring textile fabric, the combination of a pair of rollers normally held against one another, indicating means operated by one of said rollers, a casing enclosing said rollers and having a slot alining with the roller pass, means for spacing said rollers, an obstruction normally projecting across said slot at one side of the casing and means for holding said obstruction clear of said slot when the rollers are spaced.

18. In a machine for measuring textile fabric, the combination of a pair of rollers normally held against one another, indicating means operated by one of said rollers, a casing enclosing said rollers and having a slot alining with the roller pass, means for spacing said rollers, means for zero-setting said indicating means and having its operation controlled by the means for spacing said rollers whereby when the rollers are spaced the indicating means is automatically and concomitantly restored to zero, an obstruction normally projecting across said slot at one side of the casing, and means for holding said obstruction clear of said slot when the rollers are spaced.

19. In a machine for measuring textile fabric, the combination of a pair of rollers normally held against one another, indicating means operated by one of said rollers, means for zero-setting the indicating means, means for normally obstructing the pass of the rollers to prevent the movement of material between the rollers and means for spacing the rollers and simultaneously providing for the operation of the zero-setting means and the operation of the obstructing means to clear the pass of the rollers.

20. In a machine for measuring textile fabric, the combination of a pair of rollers normally held against one another, a bar normally obstructing the roller pass and during the operation of the machine supported on and by the fabric movable between the rollers, means for spacing the rollers and means automatically operated when the rollers are spaced for raising said bar above the pass of the rollers.

21. In a machine for measuring textile fabric, the combination of a pair of rollers normally held against one another, a movable carrier for one of the rollers and operable to space the rollers, a bar normally obstructing the roller pass, a pivoted arm carrying said bar and having a lug and an arm movable with said carrier and engaging said lug, thereby to operate the pivoted arm and move the bar clear of the roller pass when the carrier is operated to space the rollers.

22. In a machine for measuring textile fabric, the combination of a power roller, a lower roller normally held against the same, a pivoted carrier for the lower roller and operable to space the same from the power roller, a bar normally obstructing the roller pass, an arm carrying said bar and pivoted adjacent said carrier, said arm having a lug, and an arm movable with said carrier and engaging said lug thereby to operate the pivoted arm and move the bar above the roller pass when the carrier is lowered to space the rollers.

23. In a machine for measuring textile fabric, the combination of a pair of rollers, indicating means operated by one of the rollers, means for normally obstructing the roller pass, means for zero-setting the indicating means and a common actuating element for providing for the operation of said zero-setting means and the simultaneous operation of said obstructing means to clear the roller pass.

24. In a machine for measuring textile fabric, the combination of a pair of rollers, normally held against one another and adapted to be spaced, indicating means operated by one of the rollers, means for normally obstructing the roller pass, means for zero-setting the indicating means, and a common actuating element for simultaneously spacing the rollers, operating the obstructing means to clear the roller pass, and providing for the operation of said zero-setting means.

25. In a machine for measuring textile fabric, the combination of a pair of rollers normally held together and adapted to be spaced, one of said rollers being a power roller, means for normally holding the power roller against operative rotation, means for operating said means to release the power roller when the rollers are spaced and other means operated by the fabric to be measured for operating the first named means to release the power roller when the said fabric is held between the rollers.

26. In a machine for measuring textile fabric, the combination of a pair of rollers normally held together and adapted to be spaced, one of the rollers being a power roller, a ratchet wheel associated with the power roller, a dog normally movable to engage the ratchet wheel, means for moving said dog clear of the ratchet wheel when the rollers are spaced and means operated by the fabric to be measured for holding the dog clear of the ratchet wheel when said fabric is held between the rollers.

27. In a machine for measuring textile fabric, the combination of a pair of rollers, one of which is a power roller, a ratchet wheel associated with the power roller, a dog normally movable to engage the ratchet wheel, a part supported by the fabric to be measured when said fabric is held between the rollers, said part being movable when the fabric is withdrawn, and a connection between said part and said dog to hold the latter clear of the ratchet wheel during the measuring operation.

28. In a machine for measuring textile fabric, the combination of a pair of co-operating rollers, the upper roller being a power roller, a depressible carrier for the lower roller, an arm pivoted adjacent said carrier, a ratchet wheel associated with the upper roller, a dog connected to said arm to normally engage the ratchet wheel and hold the power roller against operative rotation, and means operated by said carrier when depressed to raise said arm and thereby move said dog clear of the ratchet wheel.

29. In a machine for measuring textile fabric, the combination of a pair of co-operative rollers, the upper roller being a power roller, a depressible carrier for the lower roller, an arm pivoted adjacent said carrier, a ratchet wheel associated with the upper roller, a dog connected to said arm to normally engage the ratchet wheel and hold the power roller against operative rotation, means operated by the carrier when depressed to raise said arm and thereby move said dog clear of the ratchet wheel, and a bar carried by said arm for support by the fabric held between the rollers, said fabric thereby holding said arm, during the measuring operation, at an elevation in which said dog is held clear of said ratchet wheel.

30. In a machine for measuring textile fabric, the combination of a pair of rollers normally held against one another, one of the rollers being a power roller, means for normally holding the power roller against operative rotation, means for spacing the rollers and means operated in connection with the operation of the roller spacing means for operating said first named means to release the power roller.

31. In a machine for measuring textile fabric, the combination of a pair of rollers normally held against one another, one of the rollers being a power roller, indicating means operated by the power roller, means for zero-setting the indicating means, means for normally holding the power roller against operative rotation, means for normally inhibiting the operation of the zero-setting means and means for operating said holding means to release the power roller when said inhibiting means is released to permit the operation of said zero-setting means.

32. In a machine for measuring textile fabric, the combination of a pair of rollers normally held against one another, one of the rollers being a power roller, indicating means operated by the power roller, means for zero-setting the indicating means, means for normally holding the power roller against operative rotation, means for spacing the rollers, means operated in connection with the operation of the roller spacing means to provide for an operation of said zero-setting means and other means operated in connection with the operation of said roller spacing means for operating said holding means to release the power roller.

33. In a machine for measuring textile fabric, the combination of a pair of rollers, one of said rollers being a power roller, means for normally obstructing the roller pass, means for normally holding the power roller against operative rotation and an element connected to both of said means and movable to cause the obstructing means to clear the roller pass and the holding means to simultaneously release the power roller.

34. In a machine for measuring textile fabric, the combination of a pair of rollers normally held against one another, one of said rollers being a power roller, means for normally obstructing the roller pass, means for normally holding the power roller against operative rotation, means for spacing said rollers and an element connected to both said obstructing means and said holding means and operated by said roller spacing means to cause the obstructing means to clear the roller pass and the holding means to simultaneously release the power roller.

35. In a machine for measuring textile fabric, the combination of a pair of rollers normally held against one another, one of said rollers being a power roller, means for normally obstructing the roller pass, means for normally holding the power roller against operative rotation, means for spacing said rollers and an element connected to both said obstructing means and said holding means and operated by said roller spacing means to cause the obstructing means to clear the roller pass and the holding means to simultaneously release the power roller, said obstructing means being supported by the measuring operation and when so supported operating said element to cause the holding means to release the power roller.

36. In a machine for measuring textile fabric, the combination of a pair of rollers, one of which is a power roller, and a movable normally operative obstruction to the pass between said rollers, said obstruction being mounted for support by the fabric during the operation of the machine.

In testimony whereof I have hereunto set my hand in presence of two subscribing witnesses.

JOHN F. STOCKE.

Witnesses:
FRED. E. BAKER,
F. A. KAISER.